United States Patent [19] [11] Patent Number: 5,036,174
Iwasaki et al. [45] Date of Patent: Jul. 30, 1991

[54] WIRE ELECTRODE SUPPLYING APPARATUS FOR WIRE ELECTRIC DISCHARGE MACHINE

[75] Inventors: Takeshi Iwasaki; Takeshi Yatomi; Akihiro Sakai, all of Nagoya, Japan

[73] Assignee: Mitsubishi Denki Kabushiki Kaisha, Tokyo, Japan

[21] Appl. No.: 511,702

[22] Filed: Apr. 20, 1990

[30] Foreign Application Priority Data

Apr. 28, 1989 [JP] Japan .................................. 1-111703
Apr. 28, 1989 [JP] Japan .................................. 1-111704

[51] Int. Cl.$^5$ ............................................. B23H 7/10
[52] U.S. Cl. ................................ 219/69.12; 219/69.14
[58] Field of Search ................ 219/69.12, 69.14, 69.13

[56] References Cited

U.S. PATENT DOCUMENTS 4,814,572 3/1989 Aso et al. ........................ 219/69.12

FOREIGN PATENT DOCUMENTS 55-46806 11/1980 Japan .
56-10130 3/1981 Japan .
130129 6/1987 Japan .............................. 219/69.12
62-47135 10/1987 Japan .
1-205930 8/1989 Japan .............................. 219/69.12
8903743 5/1989 PCT Int'l Appl. .............. 219/69.13

Primary Examiner—Geoffrey S. Evans
Attorney, Agent, or Firm—Sughrue, Mion, Zinn, Macpeak and Seas

[57] ABSTRACT

A wire electrode supplying apparatus for a wire electric discharge machine to effect the machining of a workpiece by inserting a wire electrode through the workpiece and allowing electric discharge to take place between the workpiece and the wire electrode. In this apparatus, a wire electrode feeding section is provided for inserting the wire electrode through the workpiece, as well as a feeding-side guide section and a receiving-side guide section are provided with the workpiece placed therebetween for the positioning of the wire electrode. The wire electrode is formed of a small-diameter wire, and the feeding-side guide section and the receiving side guide section are respectively provided with small openings for constraining the direction of its movement. The passage of the wire electrode through the small openings is aided by reducing the speed of feeding the wire electrode when the wire electrode passes through the small openings. A vertically movable jet nozzle is provided for allowing a working fluid to be jetted from the vicinity of the feeding-side guide section toward the receiving-side guide section so that the wire electrode after passing through the feeding-side guide section heads toward the receiving-side guide section. By starting the jetting of the working fluid after passing through the jet nozzle, the wire electrode is guided positively.

20 Claims, 8 Drawing Sheets

WIRE ELECTRODE SUPPLYING APPARATUS FOR WIRE ELECTRIC DISCHARGE MACHINE

BACKGROUND OF THE INVENTION

The present invention relates to an apparatus for conveying a wire electrode to a workpiece in wire electric discharge machining, i.e., a wire electrode supplying apparatus for a wire electric discharge machine.

FIG. 5 illustrates an example of a conventional wire electrode supplying apparatus disclosed in, for instance, Japanese Patent Publication No. 10130/1981 or 47135/1987. In this example, a wire electrode, while being constrained by a jet of working fluid such as water, is conveyed from a wire electrode feeding-side wire guide section to a wire electrode receiving-side wire guide section that are arranged with a workpiece placed therebetween. In the drawing, reference numeral 1 denotes a workpiece; 2, a machining start hole formed in the workpiece 1; 3, a wire electrode which discharges electricity between the same and the workpiece 1; 4, a wire electrode feeding-side wire guide section, and 5, a support member. An upper wire guide 6 has at its head a dies guide 7 having a smaller clearance with respect to the wire electrode 3. Numeral 8 denotes guide dies, and numeral 9 denotes a power supplying element which is fitted in the upper wire guide 6 formed into a cylindrical configuration. The wire electrode 3 is supported by the guide dies 8 and the dies guide 7 on the upper and lower sides of the power supplying element 9, respectively, so as to be held along a longitudinal center line of the wire electrode feeding-side wire guide section 4. Accordingly, the wire electrode 3 is squeezed by and is brought into contact with notched surfaces of the power supplying element 9. Numeral 10 denotes a jet nozzle. A small-diameter opening is provided in the center of a bottom plate of the jet nozzle 10 coaxially with the wire electrode 3, and the jet nozzle 10 is arranged in such a manner as to be vertically slidable inside the support member 5. Numeral 11 denotes a compression spring which is disposed in such a manner as to surround the jet nozzle 10 inside the support member 5. Normally, the compression spring 11 keeps the jet nozzle 10 pressed to its upper limit, in which case an inner bottom surface of the jet nozzle 10 and a lower end surface of the upper wire guide 6 are spaced apart from each other with a small clearance. Numeral 12 denotes a working fluid injection nozzle, and numerals 13, 14, 15 denote working fluid introducing passages. When the working fluid flows in through the working fluid introducing passage 13, the working fluid is filled in a chamber partitioned by an inner wall of the support member 5 and an inner wall of the jet nozzle 10, and downward pressure is applied to an upper surface of a flange of the jet nozzle 10 and an inner bottom surface thereof. Furthermore, when the jet nozzle 10 is thereby lowered against the compression spring 1, the working fluid is jetted through the opening at the bottom plate of the jet nozzle 10. The wire electrode 3 is thus constrained and conveyed to the workpiece 1 by this jet. When the working fluid flows in through the working fluid introducing passage 14, the working fluid is filled in a chamber partitioned by an inner wall of the support member 5 and an outer wall of the jet nozzle 10. The working fluid is then filled in the interior of the working fluid injection nozzle 12 through the working fluid introducing passage 15, and is injected toward the workpiece 1 through the opening of the working fluid injection nozzle 12 so as to effect wire electric discharge machining. Numeral 20 denotes a wire electrode receiving-side wire guide section, and 21 denotes a support member. Numeral 22 denotes a lower wire guide which has, at its head, dies having a small clearance with respect to the wire electrode 3. Numeral 23 denotes power feeding dies; 24, guide dies; and 25, a working fluid injection nozzle. Numeral 30 denotes a mounting plate for supporting the apparatus from its rear; 31, guide dies; and 32, a capstan roller. A wire feed motor 33 rotatively drives a capstan roller 32, and in this example a DC motor is used as the feed motor 33. A pinch roller 34 is openably fixed to the mounting plate 30 via a support arm 35 and a mounting shaft 36. The pinch roller 34 is constantly pressed against the capstan roller 32 by means of a compression spring 37 interposed between the support arm 35 and the mounting plate 30. The compression spring 37 is accommodated in and fixed to an accommodating block 38 provided on a front surface of the mounting plate 30. Numerals 40, 41 denote guide pipes; numeral 42 denotes a guide pipe holder; and 43, a cylinder block. The guide pipe 40 is secured to the cylinder block 43 via the guide pipe holder 42. An upper portion of the guide pipe 41 is formed into a flange, the guide pipe 41 being disposed in such a manner as to be vertically slidable inside the cylinder block 43 by means of this flange. The guide pipe 40 is coaxially inserted in the guide pipe 41 such the guide pipes 40, 41 overlap with each other over a substantial length in a longitudinal direction with a fixed clearance between an outer peripheral surface of the guide pipe 40 and an inner peripheral surface of the guide pipe 41. Air introducing passages 44, 45 are provided in the cylinder block 43, and the arrangement is such that air used for the lifting and lowering of the guide pipe is supplied by an unillustrated air supplying device to the interior of the cylinder block 43.

By virtue of the above-described arrangement, when the wire electrode 3 is automatically supplied, air is made to flow into the cylinder block 43 through the air introducing passage 44 so as to apply pressure to the upper surface of the flange of the guide pipe 41. When the guide pipe 41 is lowered to its lower limit by this pressure, the space between a lower end of the guide pipe 40 and an upper surface of the guide dies 8 is shut off from the outside, so that an enclosed space is formed along the wire electrode 3 inside the guide pipe 41. Simultaneously, if the working fluid is allowed to flow into the support member 5 from an unillustrated working fluid supplying device via the working fluid introducing passage 13, the jet nozzle 10 receives the hydraulic pressure of the working fluid on its flange surface, with the result that the jet nozzle 10 is pressed down. In consequence, a sufficient gap is produced between the opening at the bottom plate of the jet nozzle and the upper wire guide 6. Consequently, the working fluid jetted through the opening at the bottom plate of the jet nozzle 10 advances straightforward to a far distance without being scattered. The wire electrode 3 is constrained and conveyed to the wire electrode receiving-side wire guide section 20 by the working fluid thus jetted. At this time, the wire electrode 3 has already been cut by an unillustrated known wire electrode cutting mechanism disclosed in, for instance, Japanese Patent Laid-Open No. 80528/1985, and its tip is located in the guide pipe 41 above the guide dies 8. After the guide pipe 41 is lowered, the feed motor 33 is started to rotate the capstan roller 32 and the pinch roller 34, the wire electrode 3 is then fed to the wire electrode feeding-side wire guide section 4 where it passes consecutively through the guide dies 8, the upper wire guide 6, and the jet nozzle 10. The wire electrode 3 while being constrained by the jet continues to be fed and passes consecutively through the machining start hole 2, the lower wire guide 22, the power feed dies 23, and the guide dies 24, and is conveyed by an unillustrated wire collecting mechanism using a fluid, a belt, a roller, or the like. Then, the wire electrode 3 is taken up below the guide dies 24, or accommodated in a specific container. As a result of the above-described operation, the wire electric discharge machine is set in a state in which it is capable of effecting wire electric discharge machining.

However, the following problems have hitherto been encountered with the conventional wire electrode supplying apparatuses for wire electric discharge machines.

First, as shown in FIG. 6, in a state in which the jet nozzle 10 has been lowered after the influx of the working fluid through the working fluid introducing passage 44, the distance between the dies guide 7 and the opening of the jet nozzle 10 is large. Moreover, the wire electrode 3 is inherently liable to bend, and the tip of the wire electrode 3 has a certain degree of freedom to move. Therefore, after passing through the dies guide 7 with the jet nozzle 10 lowered, when the tip of the wire electrode 3 is further fed toward the opening of the jet nozzle 10, the tip of the wire electrode 3 can deviate from a vertical line and become unable to pass through the opening by being caught on the inner bottom surface of the jet nozzle 10. In this situation, as the feed motor 33 further rotates, the wire electrode 3 is forced out through a gap formed between the capstan roller 32 and the pinch roller 34 on the one hand, and the guide pipe 40 on the other. This results in the serious drawback of rendering the proper feeding of the wire electrode 3 impossible.

Secondly, as shown in FIG. 7, if the wire electrode 3 is fed by a greater length from the working fluid injection nozzle 12 without being properly constrained by the jet, the wire electrode 3 is unable to pass through the machining start hole 2 and deviates substantially therefrom for the same reason as that mentioned above. Even if the working fluid is subsequently jetted, it is impossible for the tip of the wire electrode 3 to be inserted into the machining start hole 2.

Thirdly, at the time when the wire electrode 3 passes through the upper wire guide 6 or the lower wire guide 22, the tip of the wire electrode 3 receives load when the tip passes through the wire guide with a small clearance in the advancing direction. In particular, in order to improve the accuracy of wire electric discharge machining, it is desirable to make the clearance of the dies guide 7 as small as possible, but the smaller the clearance, the greater the load entailed in the passage of the wire electrode 3. In addition, the greater the speed of feeding the wire electrode 3, the greater the load applied to the wire electrode 3. As the load applied to the wire electrode 3 with respect to the direction of its feed increases, the wire electrode 3 is pressed against the inner peripheral surfaces of the pipes 40, 41 and the upper wire guide 6. With a further increase in the load, the wire electrode 3 is even forced out through the gap between the pinch roller 34 and the capstan roller 32 on the one hand, and the guide pipe 40 on the other, with the result that the subsequent proper feeding of the wire electrode 3 becomes impossible. Accordingly, in the case of the conventional apparatus, a sequence is adapted in which until the tip of the wire electrode 3 reaches the unillustrated wire collecting mechanism from a wire cutting position, the speed of feeding the wire electrode 3 is set to a low speed, e.g., 5 mm/sec., and after the tip of the wire electrode 3 reaches the wire collecting mechanism and becomes conveyable by the wire collecting mechanism, the speed of feeding the wire electrode 3 is changed to a high speed, e.g., 50 mm/sec. The arrival of the wire electrode 3 at the wire collecting mechanism is detected by a means (not illustrated) for detecting the passage of the wire electrode 3, which includes a timer or a sensor provided on, for instance, the wire recovering mechanism, a detection signal being sent by the detecting means to a numerical controller for a determination of the arrival. Consequently, as for the duration of low-speed operation, if the distance between the two wire guides is, for example, 250 mm, it takes as much as 50 seconds for the wire electrode 3 to pass between these wire guides alone. Hence, the duration of passage of the wire electrode 3 becomes substantially long, thereby rendering the operation inefficient.

SUMMARY OF THE INVENTION

The present invention has been devised to overcome the above-described drawbacks of the conventional art.

Specifically, a primary object of the present invention is to prevent the occurrence of such problems as a wire electrode becoming forced out and becoming impossible to insert, thereby positively feeding the wire electrode to a workpiece.

A second object of the present invention is to reduce the time required in feeding a wire electrode from a feeding-side guide section for guiding the feeding of a wire electrode to a receiving-side guide section for guiding the reception of the wire electrode, thereby increasing the efficiency with which the wire electrode is fed.

To these ends, in accordance with a first aspect of the present invention, there is provided a wire electrode supplying apparatus for a wire electric discharge machine, comprising:

(a) a feeding section for feeding the wire electrode;

(b) a feeding-side guide section through which the wire electrode fed from the feeding section is passed through and which is adapted to constrain the direction of movement of the wire electrode;

(c) a receiving-side guide section for guiding the wire electrode, the receiving-side guide section being disposed in such a manner as to oppose the feeding-side guide section, and the wire electrode fed from the feeding-side guide section being passed through the receiving-side guide section;

(d) a feeding amount detecting means for detecting an amount of the wire electrode fed from the feeding section;

(e) a jet nozzle for constraining the direction of movement, toward the receiving-side guide section, of the wire electrode fed from the feeding-side guide section, as a jet of working fluid flows toward the receiving-side guide section; and (f) control means for controlling the supply of the jet to the jet nozzle in correspondence with the detected result of the feeding amount detecting means.

In this arrangement, when the wire electrode is fed from the feeding section and the wire electrode is passed through the feeding-side guide section, the feeding-side guide section constrains the direction of movement of the wire electrode. The wire electrode thus fed from the feeding-side guide section moves toward the receiving-side guide section while being constrained by a jet of working fluid injected through the jet nozzle. The wire electrode which has been inserted into the receiving-side guide section is guided by the receiving side guide section. An amount of the wire electrode fed from the feeding section is detected by the feeding amount detecting means, and the control means controls the supply of the working fluid to the jet nozzle in accordance with the detected result of the feeding amount detecting means.

In accordance with the above-described arrangement, since the wire electrode moves while being restrained by the jet, troubles such as the wire electrode being forced out and becoming impossible to insert are prevented, and the wire electrode is supplied more positively.

The control means in this arrangement controls, for instance, the injection stat timing of the working fluid.

That is, when the amount of the wire electrode fed is detected by the feeding amount detecting means, the control means ascertains the position of the tip of the wire electrode on the basis of the detected result. Furthermore, after the tip of the wire electrode has passed through the jet nozzle, the control means allows the jetting of the wire electrode to be started on the basis of the ascertained result.

In a case where the jet nozzle is arranged to be movable in the direction of feeding the wire electrode by means of the hydraulic pressure when the wire electrode is jetted, the control means allows the jetting of the working fluid to be started when the tip of the wire electrode has passed beyond the position of the jet nozzle located after its movement.

Furthermore, in a case where a working fluid injection nozzle is provided forwardly of the jet nozzle in the direction of feeding of the wire electrode, the control means allows the jetting of the working fluid to be started when the tip of the wire electrode is located between the position of jet nozzle after its movement by hydraulic pressure and the position of the working fluid injection nozzle.

In accordance with a second aspect of the present invention, there is provided a wire electrode supplying apparatus for a wire electric discharge machine, comprising:

(a) a feeding section for feeding the wire electrode;

(b) a feeding-side guide section through which the wire electrode fed from the feeding section is passed through and which is adapted to constrain the direction of movement of the wire electrode;

(c) a receiving-side guide section for guiding the wire electrode, the receiving-side guide section being disposed in such a manner as to oppose the feeding-side guide section, and the wire electrode fed from the feeding-side guide section being passed through the receiving-side guide section;

(d) a feeding amount detecting means for detecting an amount of the wire electrode fed from the feeding section;

(e) a jet nozzle for constraining the direction of movement, toward the receiving-side guide section, of the wire electrode fed from the feeding-side guide section, as a jet of working fluid flows toward the receiving-side guide section; and (f) control means for controlling the speed of feeding the wire electrode in the feeding section in correspondence with the detected result of the feeding amount detecting means.

In this arrangement, when the wire electrode is fed from the feeding section and the wire electrode is passed through the feeding-side guide section, the feeding-side guide section constrains the direction of movement of the wire electrode. The wire electrode thus fed from the feeding-side guide section is passed through the receiving-side guide section. The receiving-side guide section guides the wire electrode inserted into it. An amount of the wire electrode fed from the feeding section is detected by the feeding amount detecting means, and the control means controls the speed of feeding of the wire electrode in the feeding section in accordance with the detected result of the feeding amount detecting means.

Hence, in accordance with the above-described arrangement, the speed of feeding of the wire electrode can be controlled in correspondence with the present position of the tip of the wire electrode. As a result, the time of feeding the wire electrode can be reduced, and it therefore becomes possible to supply the wire electrode efficiently.

In this arrangement, small openings may be provided in the respective tips of the feeding-side guide section and the receiving-side guide section.

If the small opening is provided at the tip of the feeding-side guide section, the speed of feeding the wire electrode may be controlled as follows: Namely, when the amount of the wire electrode fed is detected by the feeding amount detecting means, the control means ascertains the position of the tip of the wire electrode on the basis of the detected result of the feeding amount detecting means, and lowers the speed of feeding the wire electrode immediately before the tip of the wire electrode reaches the small opening in the feeding-side guide section, and increases the speed of feeding the wire electrode immediately after the tip of the wire electrode passes the small opening.

Meanwhile, if the small opening is provided at the tip of the receiving-side guide section, the speed of feeding the wire electrode may be effected as follows: Namely, when the amount of the wire electrode fed is detected by the feeding amount detecting means, the control means ascertains the position of the tip of the wire electrode on the basis of the detected result of the feeding amount detecting means, and lowers the speed of feeding the wire electrode immediately before the tip of the wire electrode reaches the small opening in the receiving-side guide section, and increases the speed of feeding the wire electrode immediately after the tip of the wire electrode passes the small opening.

In addition, in a case where the small openings are respectively provided in the tips of the feeding-side guide section and the receiving-side guide section, it suffices if the aforementioned two types of control are carried out.

In accordance with a third aspect of the present invention, there is provided a wire electrode supplying apparatus for a wire electric discharge machine, comprising:

(a) a feeding section for feeding the wire electrode;

(b) a feeding-side guide section through which the wire electrode fed from the feeding section is passed through and which is adapted to constrain the direction of movement of the wire electrode;

(c) a receiving-side guide section for guiding the wire electrode, the receiving-side guide section being disposed in such a manner as to oppose the feeding-side guide section, and the wire electrode fed from the feeding-side guide section being passed through the receiving-side guide section;

(d) a feeding amount detecting means for detecting an amount of the wire electrode fed from the feeding section;

(e) a jet nozzle for constraining the direction of movement, toward the receiving-side guide section, of the wire electrode fed from the feeding-side guide section, as a jet of working fluid flows toward the receiving-side guide section; and (f) control means for controlling the speed of feeding the wire electrode in the feeding section and controlling the supply of the jet to the jet nozzle in correspondence with the detected result of the feeding amount detecting means.

In this arrangement, when the wire electrode is fed from the feeding section and the wire electrode is passed through the feeding-side guide section, the feeding-side guide section constrains the direction of movement of the wire electrode. The wire electrode thus fed from the feeding-side guide section moves toward the receiving-side guide section while being constrained by a jet of working fluid injected through the jet nozzle. The wire electrode which has been inserted into the receiving-side guide section is guided by the receiving-side guide section. An amount of the wire electrode fed from the feeding section is detected by the feeding amount detecting means, and the control means controls the supply of the working fluid to the jet nozzle in accordance with the detected result of the feeding amount detecting means and also controls the speed of feeding the wire electrode in the feeding section.

In accordance with the above-described arrangement, the advantages obtained in accordance with the above-described first and second aspects of the invention can be obtained. In short, troubles such as the wire electrode being forced out and becoming impossible to insert are prevented, and the wire electrode is supplied more positively. At the same time, the feeding time of the wire electrode can be reduced and the supply of the wire electrode can be conducted efficiently.

In the foregoing three aspects of the invention, the following arrangements may be adopted as the feeding section and the feeding amount controlling means.

First, the feeding section is provided with a roller for feeding the wire electrode as the roller is brought into contact with the wire electrode and rotates, and the feeding amount detecting means is provided with a rotary encoder for outputting a pulse signal in correspondence with the rotation of the roller.

In this case, the amount of the wire electrode fed is detected as a pulse signal outputted from the rotary encoder in correspondence with the rotation of the roller.

Furthermore, the feeding amount detecting means thus having the rotary encoder may be further provided with a counter for counting the number of pulses outputted from the rotary encoder and a comparator for comparing the counted result of the counter with a predetermined value.

In this case, number of the pulse signals outputted from the rotary encoder is counted by the counter and is compared with the predetermined value set in the comparator. Accordingly, when the counted result of the counter coincides with the predetermined value set in the comparator, it can be considered that the tip of the wire electrode has arrived at a predetermined position. This information is be used for various controlling operations of the control means.

Secondly, the feeding section may be provided with a belt for feeding the wire electrode as the belt is brought into contact with the wire electrode and rotates and a pulley for moving the belt, and the feeding amount detecting means may be provided with a rotary encoder for outputting a pulse signal in correspondence with the rotation of the pulley.

In this case, the amount of the wire electrode fed is detected as a pulse signal corresponding to the rotation of the pulley.

Thirdly, the feeding section may be provided with a belt on which optically detectable marks are provided at predetermined intervals and which is adapted to feed the wire electrode as the belt is brought into contact with the wire electrode and rotates, and the feeding amount detecting means may be provided with a photosensor for optically detecting the marks provided on the belt at the predetermined intervals.

In this case, the movement of the marks provided on the belt is optically detected by the photosensor. Since the movement of the marks corresponds to the amount of the wire electrode fed, the amount of the wire electrode fed is thus detected by the photosensor.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying diagrams, a description will be given of the preferred embodiments of the present invention.

Figure 1:
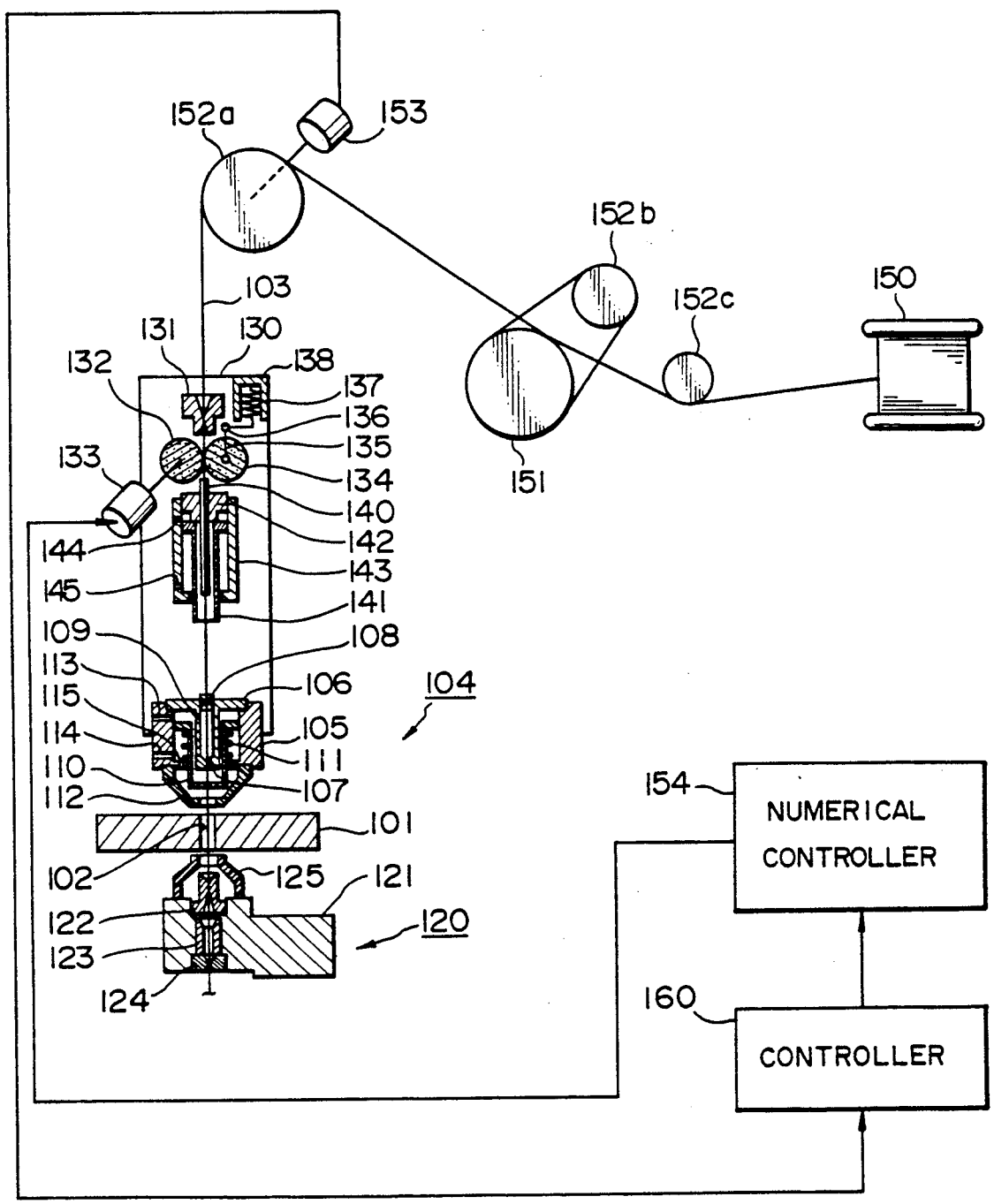
FIG. 1 is a diagram illustrating a configuration of a wire electrode supplying apparatus for a wire electric discharge machine in accordance with a first embodiment of the present invention, the drawing illustrating a schematic cross section of an arrangement in the vicinity of a wire electrode and a configuration concerning wire electrode feed control in block form.

FIG. 1 illustrates an arrangement of a preferred embodiment of the present invention. In this drawing, reference numeral 150 denotes a wire supplying bobbin; 151, a brake pulley; 152a, 152b, and 152c denote pulleys; 153 denotes a rotary encoder secured to the pulley 152a; and 154, a known numerical controller.

Figure 2:
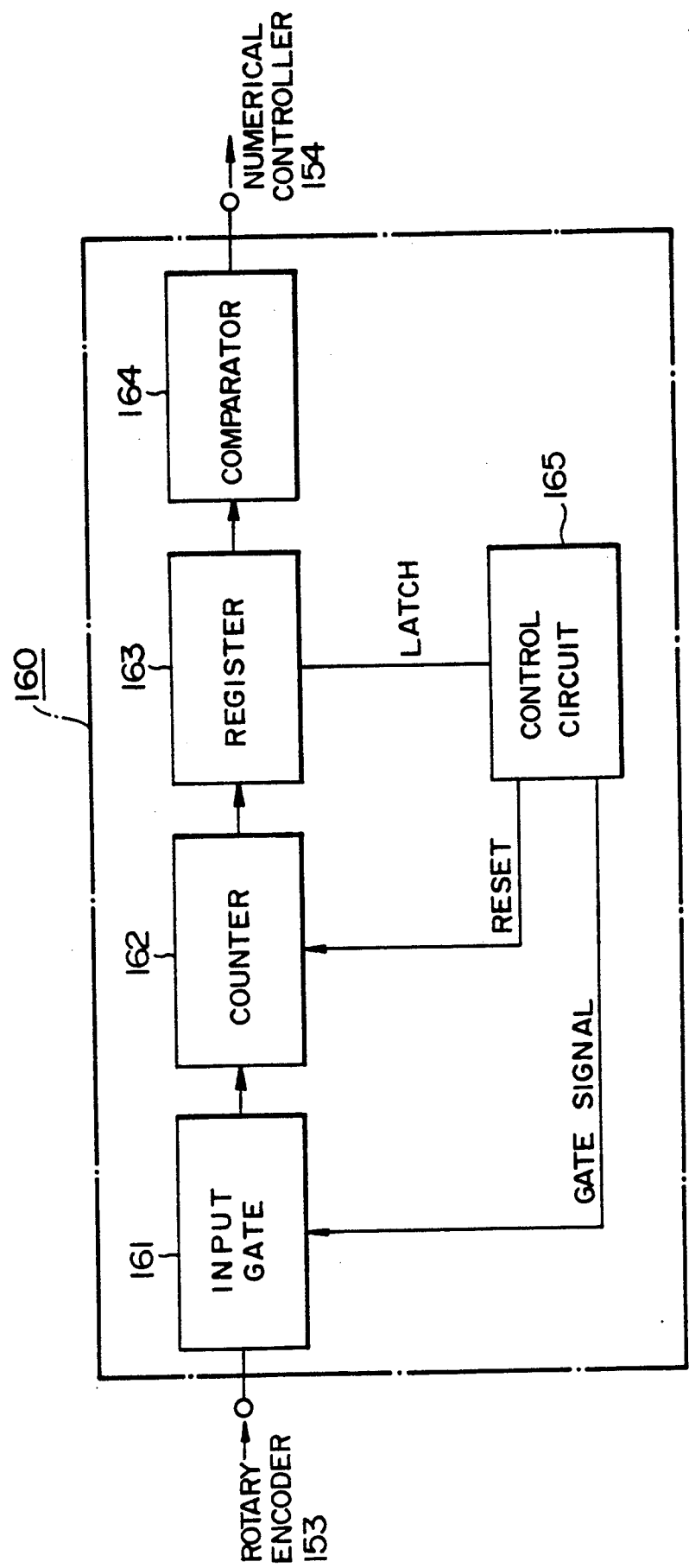
FIG. 2 is a block diagram illustrating a configuration of a controller of the embodiment shown in FIG. 1.

FIG. 2 is a block diagram of a controller 160 which comprises an input gate 161, a counter 162, a register 163, a comparator 164, and a control circuit 165. The input gate 161 receives as its input an output from the rotary encoder 153. The counter 162 counts the number of pulse trains sent from the rotary encoder 153 via the input gate 161. The register 163 temporarily stores the counted result of the counter 162. The comparator 164 makes a comparison between the counted result of the counter 162 and a set value. Here, by the set value is meant a value corresponding to the length of a wire electrode 103 fed (i.e., the amount of feed) from the feeding start and until the tip of the wire electrode 103 reaches an optimum position for the jetting of the working fluid. The comparator 164 delivers the result to the numerical controller 154. The control circuit 165 sends a gate signal to the input gate 161 to open the gate. In addition, at the same time as the feeding of the wire electrode 103 is commenced, the control circuit 165 sends a reset signal to the counter 162 to set an initial state, and sends a latch signal to the register 163 to temporarily store the data.

A description will be given hereinunder of the operation of supplying the wire electrode by the wire electrode supplying apparatus having the above-described configuration. At the start of the operation of inserting the wire electrode 103, the numerical controller 154 sends a signal at a voltage $V_1$ to a feed motor 133. The voltage $V_1$ is used to run the feed motor 133 so that the speed of feeding the wire electrode 103 becomes high, e.g., 50 mm/sec.

Concurrently, the control circuit 165 issues a signal to the counter 162 to initialize it. The tip of the wire electrode 103 advanced downward through guide pipes 140, 141, passes through guide dies 108, is introduced into an upper wire guide 106, and reaches a first speed-changing point.

Since a short period of time is required for changing the rotational speed of the feed motor 133 to change the speed of feeding the wire electrode 103, the first speed-changing point is set at a position above a dies guide 107, located at a tip of the upper wire guide 106, by a length of the wire electrode 103 fed during this period for changing the rotational speed. The arrival of the tip of the wire electrode 103 at the first speed-changing point is detected when the counter 162 of the controller 160 sends a signal representing its counted result to the numerical controller 154, which in turn determines that the counted result coincides with a predetermined value N. At the first speed-changing point, the numerical controller 154 starts supplying a voltage $V_2$, so that the rotational speed of the feed motor 133 is changed to one corresponding to the low speed of feeding the wire electrode 103, e.g., 5 mm/sec. Accordingly, the tip of the wire electrode 103 passes through the dies guide 107 with the feeding speed set at low speed, and then reaches a second speed-change point.

The second speed-changing point is set below the dies guide 107 by a distance which allows the controller 160 to effect a determination on the basis of its minimum resolution, or by a distance incorporating slight leeway. At the second speed-changing point, the numerical controller 154 sends the voltage $V_1$, so that the rotational speed of the feed motor 133 is changed to high speed. After passing through the dies guide 107, the tip of the wire electrode 103 passes a jet nozzle 110.

Concurrently, the counter 162 is counting the number of pulse trains sent from the rotary encoder 153 in correspondence with the feeding of the wire electrode 103. The arrival of the tip of the wire electrode 103 in the vicinity of an exit of the jet nozzle 110 is determined on the basis of the set value N stored in the counter 162. That is, if the counted result of the counter 102 coincides with the set value N, which corresponds to a predetermined length of the wire electrode 103 fed from the feeding start and until the tip reaches the vicinity of the exit of the jet nozzle 110, a signal representing the arrival is issued to the numerical controller 154 which makes the determination.

Subsequently, in response to this signal the numerical controller 154 sends a signal to an unillustrated working fluid supplying unit, instructing the supplying unit to start supplying a jet of working fluid. The working fluid then flows into a support member 105 via the working fluid introducing passage 113, and the jet nozzle 110 receives the hydraulic pressure on its flange surface and is thereby pressed down.

As a result, a sufficient gap is created between the opening of the jet nozzle 110 and the upper wire guide 106, and the working fluid is jetted through the opening of the jet nozzle 110 so that it will advance straightforward to a far distance without being scattered. Hence, the wire electrode 103 is conveyed to a wire electrode receiving-side wire guide section 120 while being constrained by the jet of working fluid.

At the time of the spouting of the jet, it is most preferable for the tip of the wire electrode 103 to be located in the range between the lower end surface of the jet nozzle 110 and the vicinity of the lower end surface of a working fluid injection nozzle 112 with the jet nozzle 110 set at its lowermost limit.

When the tip of the wire electrode 103 reaches a third speed-changing pint set above a lower wire guide 122, the feeding speed is set to low speed, and when it reaches a fourth speed-changing point set below the lower wire guide 122, the feeding speed is changed to high speed. The operation of these speed changes is similar to the operation for the first and second speed-changing points described above.

Since there is a slight time lag after the numerical controller 154 sends a signal to the working fluid supplying unit and until the working fluid is actually jetted, the set value of the aforementioned counter 162 is corrected by a value corresponding to the length of the wire electrode 103 fed during this time lag.

It should be noted that although in the above-described arrangement the pulley 152a serves as the member which undergoes displacement in correspondence with the feeding of the wire electrode 103, the displaying member may be either one of the other pulleys 152, 152c, or any one of the brake pulley 151, a pinch roller 134, a capstan roller 132, the feed motor 133, and the wire supplying bobbin 150, and by securing an encoder (corresponding to the rotary encoder 153 in FIG. 1) to any one of these members, it is possible to attain an object similar to that of the arrangement shown in FIG. 1.

Figure 3:
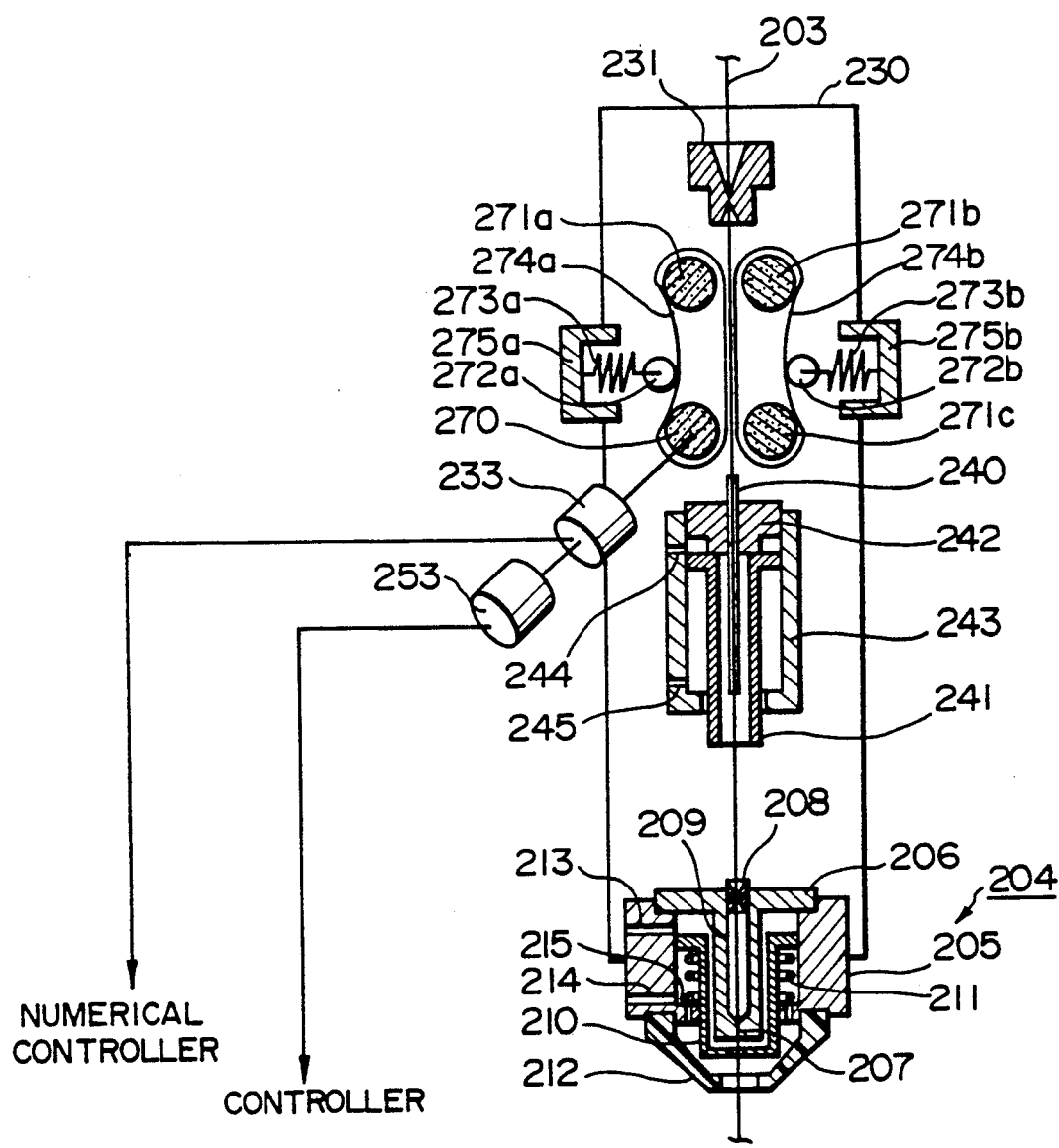
FIG. 3 is a schematic cross-sectional view of an arrangement in the vicinity of the wire electrode in accordance with a second embodiment of the present invention.

FIG. 3 illustrates an arrangement of another embodiment in which a wire electrode 203 is fed by means of a pair of endless belts. A wire feed motor 233 is secured to a drive pulley 270. Guide pulleys 271a, 271b, 271c and tension pulleys 272a, 272b are mounted on a mounting plate 230 and apply appropriate tension to a pair of belts 274a, 274b via compression springs 273a, 273b. The compression springs 273a, 273b are mounted on the mounting plate 230 using spring accommodating blocks 275a, 275b disposed on the mounting plate 230. In other words, the compression springs 273a, 273b are accommodated in holes provided in the spring accommodating blocks 275a, 275b. The wire electrode 203 is clamped by the belts 274a, 274b, and is fed as the belts 274a, 274b are rotated by the rotation of the feed motor 233. An encoder 253 is connected to the feed motor 233.

As a member which undergoes displacement in correspondence with the feeding of the wire electrode 203, it is possible to select any one of the drive pulley 270, guide pulleys 271a, 271b, 271c, and tension pulleys 272a, 272b. In this case, the encoder 253 is secured to the selected member.

Figure 4:
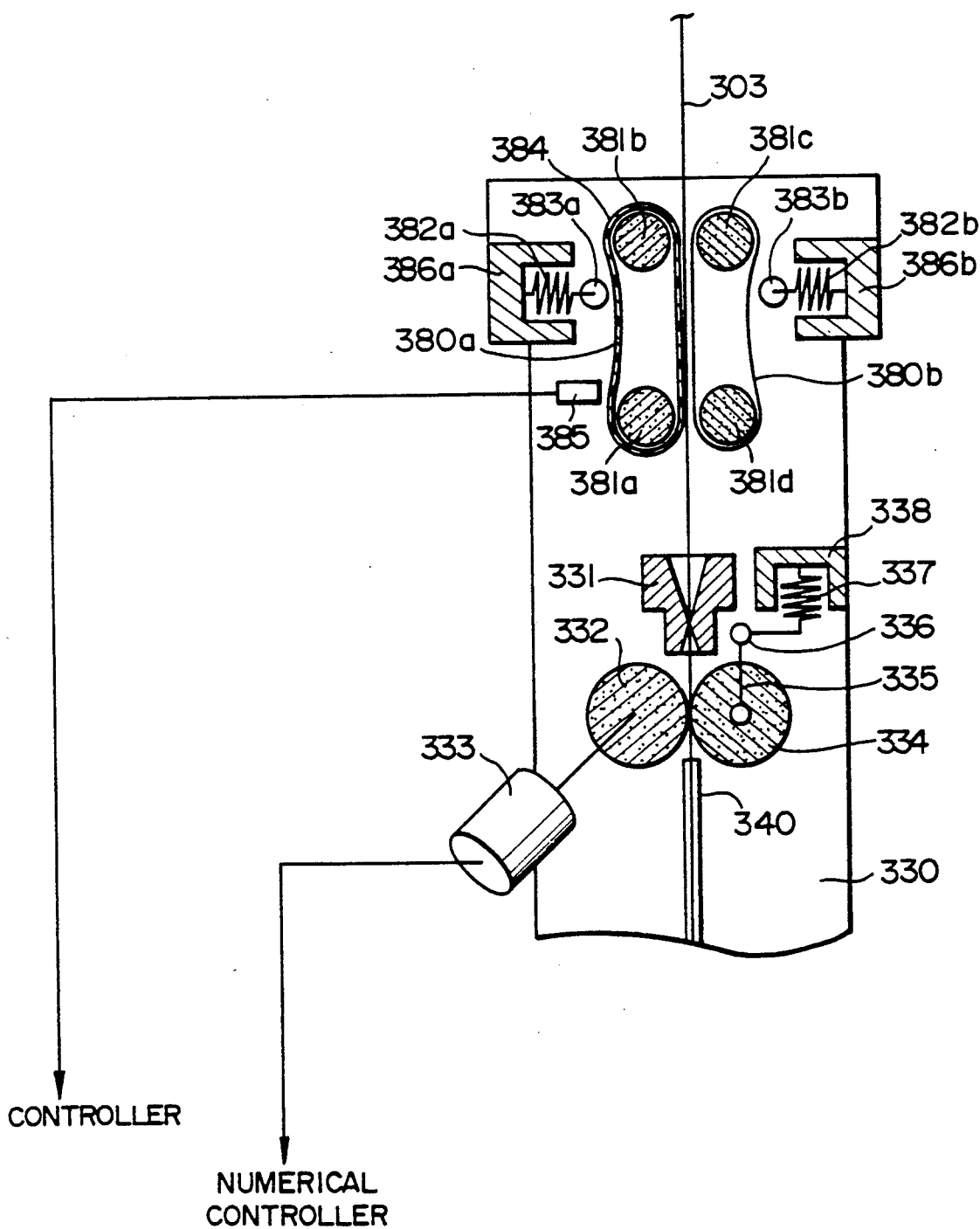
FIG. 4 is a schematic cross-sectional view of an arrangement in accordance with a third embodiment of the present invention.
Figure 5:
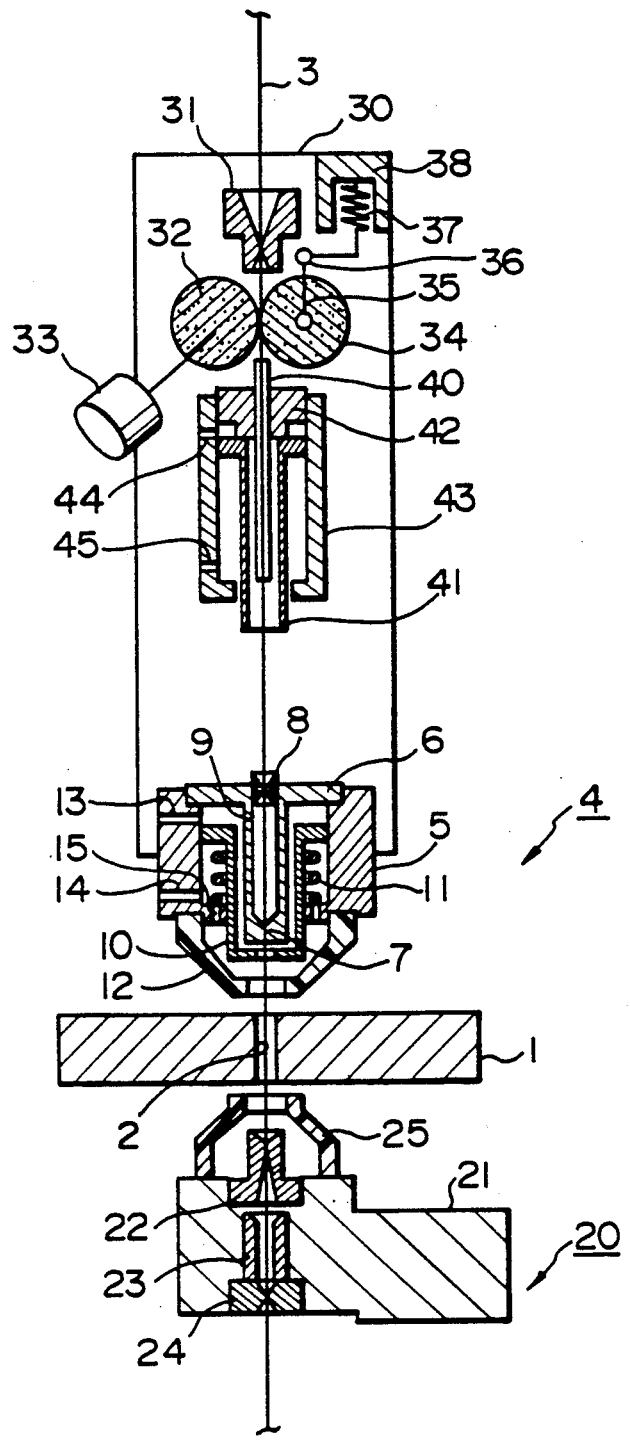
FIG. 5 is a schematic diagram of an arrangement of a conventional wire electrode supplying apparatus for a wire electric discharge machine.
Figure 6:
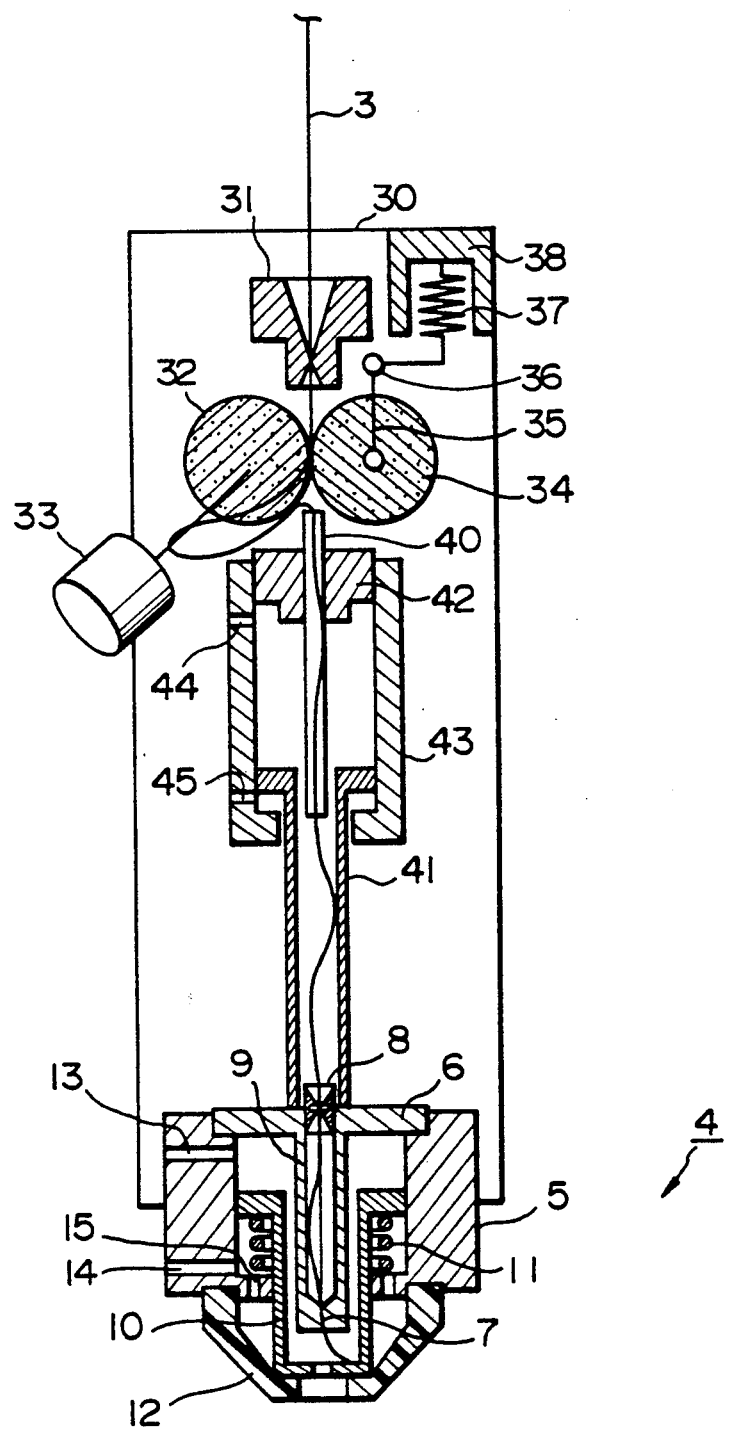
FIG. 6 is a diagram explaining problems of the apparatus shown in FIG. 5.
Figure 7:
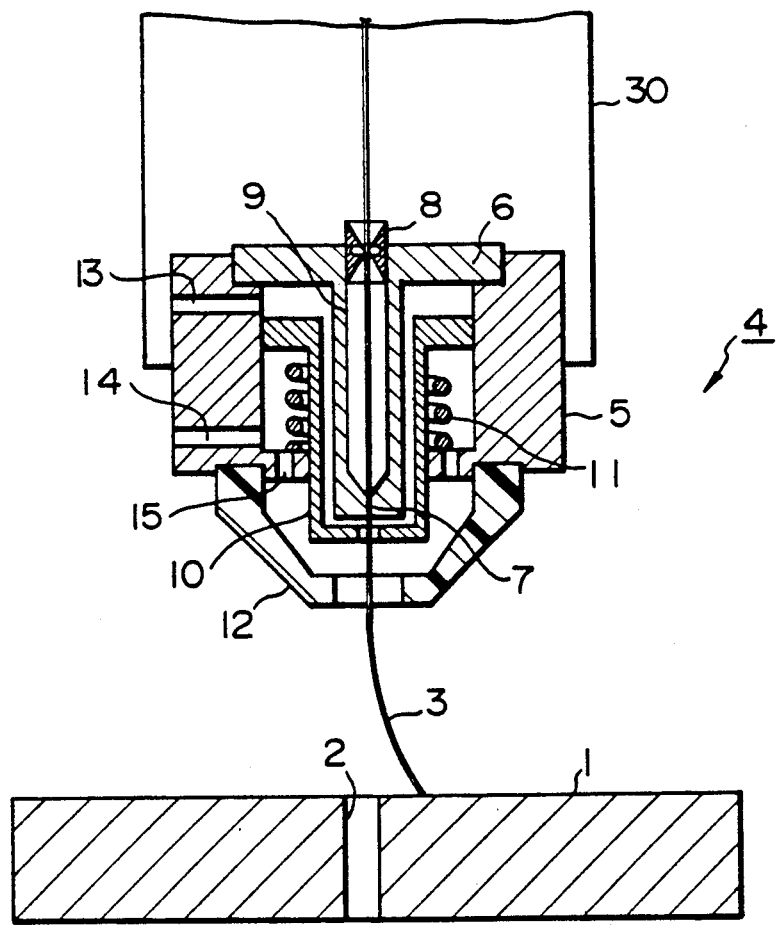
FIG. 7 is a diagram explaining other problems of the apparatus shown in FIG. 5.
Figure 8:
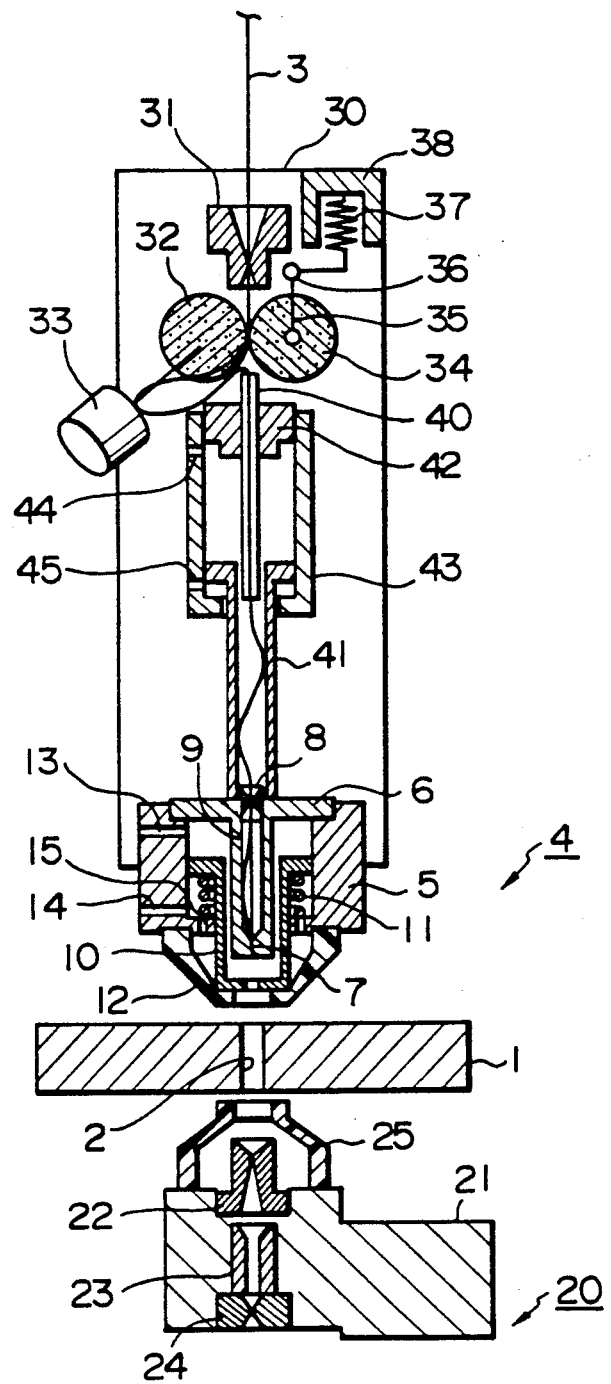
FIG. 8 is a diagram explaining still other problems of the apparatus shown in FIG. 5.

Although in the above-described embodiment the encoder serves as the means for detecting displacement, a resolver or the like may be used. An arrangement of an embodiment in which a detecting means using the encoder is illustrated in FIG. 4.

In this embodiment, a pair of belts 380a, 380b, guide pulleys 381a, 381b, 381c, 381d, and tension pulleys 382a, 382b are mounted on a mounting plate 330. The tension pulleys 382a, 382b are mounted on the mounting plate 330 via compression springs 383a, 383b accommodated in spring accommodating blocks 386a, 386c mounted on the mounting plate 330. The belts 380a, 380b are adapted to rotate as a wire electrode 303 is fed. The belt 380a is coated with white paint 384 at equal intervals. A reflection type photosensor 385 is disposed in proximity to the belt 380a. Accordingly, as the wire electrode 303 is fed, when the white paint 384 on the belt 380a passes by the vicinity of the reflection type photosensor 385, a pulse signal is delivered from the reflection type photosensor 385. As this pulse signal is counted by the controller, it is possible to detect the length of the wire electrode 303 fed.

Instead of using the white paint 384 and the reflection type photosensor 385, it is possible to adopt a combination of a metal plate and a magnetic sensor, a combination of an optical sensor and small holes formed in the belt at equal intervals, or another similar combination. Alternatively, a revolution sensor may be attached to either one of the pulleys 381a, 381b, or 381c, 381d between which the belt 380a or 380b is trained.

Although in the foregoing embodiments the speed of feeding the wire electrode is changed over in two stages, i.e., between high speed and low speed, the speed change may be effected in a greater number of stages, depending on the relative weight of load acting on the wire electrode with respect to the direction of its feed.

For instance, with reference to FIG. 1, in a section between the cutting position of the wire electrode 103 and the first feed speed-changing point, pressing forces applied by the pinch roller 134 and the capstan roller 132 are merely transmitted to the wire electrode 103. However, when the tip of the wire electrode 103 is located downwardly of the second feed speed-changing point, a hydraulic shearing force of the jet is applied to the tip, so that the wire electrode 103 is pulled downward.

As a result, when the tip of the wire electrode 103 passes the lower wire guide 122, the load applied to the wire electrode 103 entailed in its passage is alleviated as compared with the time when the tip passes through the upper wire guide 106.

Accordingly, in the section between the cutting position of the wire electrode 103 and the first feed speed-changing point, the speed of feeding the wire electrode 103 may be set to a low speed, e.g., 5 mm/sec., while in the section between the third speed-changing point to the fourth speed-changing point, the feeding speed may be set to an intermediate speed, e.g., 20 mm/sec.

In effecting wire electric discharge machining, it is a general practice to change the distance between the upper and lower wire guides depending on the thickness of the workpiece and jigs. That is, in an ordinary wire electric discharge machine, the position of one of the two wire guides is changeable.

In the embodiment shown in FIG. 1, the mounting plate 130 is secured to an unillustrated movable shaft which is vertically slidable and can be secured an an arbitrary position. Accordingly, since the distance between the second speed-changing point and the third speed-changing point can be changed from time to time, the distances from the cutting position of the wire electrode 103 to the third speed-changing point and to the fourth speed-changing point can also be changed.

To cope with these changes, the distance between the upper and lower wire guides 106 and 122 is input in advance to the numerical controller 154 via a keyboard, an NC program or the like, and set values of the counter 162 are changed on the basis of the input values. At this time, the distance $L_1$ from the cutting position of the wire electrode 103 to the upper wire guide 106 is a value peculiar to the apparatus and is fixed, while the distance $L_2$ from the upper wire guide 106 to the lower wire guide 122 is a variable value corresponding to the aforementioned input value. If it is assumed that the third and fourth speed-changing points are set upwardly and downwardly of the lower wire guide 122 by a fixed distance, e.g., $L_3$, respectively, and that the length of the wire electrode 103 to be fed per unit pulse signal sent from the encoder 153 is D, a set value for determining the arrival at the third speed-changing point can be calculated as $N_1 = L_1 + L_2 - L_3$, and a setting for determining the arrival at the fourth speed-changing point as $N_4 = L_1 + L_2 + L_3$.

In addition, a linear scale may be provided on the aforementioned movable shaft, and $L_2$ may be determined by reading a coordinate output signal from the linear scale. Furthermore, if the movable shaft can be driven by a motor, $L_2$ may be similarly calculated on the basis of a signal from a revolution sensor, such as an encoder, attached to the motor.

As described above, in accordance with the present invention, at the time when the wire electrode is fed, the speed of feeding the wire electrode is lowered immediately before the tip of the wire electrode is passed through at least either one of the feeding-side wire guide and the receiving-side wire guide, and the feeding speed is increased immediately after passage of tip of the wire electrode therethrough. Accordingly, the duration of feeding the wire electrode can be reduced, thereby making it possible to supply the wire electrode efficiently.

In addition, in accordance with the present invention, the arrangement is such that when the tip of the wire electrode fed has reached a predetermined position after passing through a tip of the jet nozzle, the working fluid is jetted to convey the wire electrode, and the wire electrode is thereby conveyed while being constrained and is introduced into the receiving-side wire guide section. Hence, the operation of supplying the wire electrode can be carried out positively, and highly reliable operation can be effected.

What is claimed is:

1. A wire electrode supplying apparatus for a wire electric discharge machine, comprising:
   a feeding section for feeding a wire electrode;
   a feeding-side guide section through which the wire electrode fed from said feeding section is passed through and which is adapted to constrain the direction of movement of the wire electrode;
   a receiving-side guide section for guiding the wire electrode, said receiving-side guide section being disposed in such a manner as to oppose said feeding-side guide section, and the wire electrode fed from said feeding-side guide section being passed through said receiving-side guide section;
   a feeding amount detecting means for detecting an amount of the wire electrode fed from said feeding section;
   a jet nozzle for constraining the direction of movement, toward said receiving-side guide section, of the wire electrode fed from said feeding-side guide section, as a jet of working fluid flows toward said receiving-side guide section; and
   control means for controlling the supply of the jet to said jet nozzle in correspondence with the detected result of said feeding amount detecting means.

2. A wire electrode supplying machine for a wire electric discharge machine according to claim 1, wherein said control means ascertains the position of a tip of the wire electrode on the basis of the detected result of said feeding amount detecting means and allows the jetting of the working fluid to be started after the tip of the wire electrode passes through said jet nozzle.

3. A wire electrode supplying machine for a wire electric discharge machine according to claim 2, wherein said jet nozzle is movable in the direction of feeding of the wire electrode by means of hydraulic pressure of the working fluid jetted, and said control means allows the jetting of the working fluid to be started when the tip of the wire electrode has passed beyond the position of said jet nozzle located after its movement.

4. A wire electrode supplying machine for a wire electric discharge machine according to claim 3, further comprising a working fluid injection nozzle disposed forwardly of said jet nozzle in the direction of feeding of the wire electrode, and said control means allows the jetting of the working fluid to be started when the tip of the wire electrode is located between the position of said nozzle after movement thereof and the position of said working fluid injection nozzle.

5. A wire electrode supplying machine for a wire electric discharge machine according to claim 1, wherein said feeding section has a roller for feeding the wire electrode as said roller is brought into contact with the wire electrode and rotates, and said feeding amount detecting means includes a rotary encoder for outputting a pulse signal in correspondence with the rotation of said roller.

6. A wire electrode supplying machine for a wire electric discharge machine according to claim 5, wherein said feeding amount detecting means includes a counter for counting the number of pulses outputted from said rotary encoder and a comparator for comparing the counted result of said counter with a predetermined value.

7. A wire electrode supplying machine for a wire electric discharge machine according to claim 1, wherein said feeding section has a belt for feeding the wire electrode as said belt is brought into contact with the wire electrode and rotates and a pulley for moving said belt, and said feeding amount detecting means includes a rotary encoder for outputting a pulse signal in correspondence with the rotation of said pulley.

8. A wire electrode supplying machine for a wire electric discharge machine according to claim 1, wherein said feeding section has a belt on which optically detectable marks are provided at predetermined intervals and which is adapted to feed the wire electrode as said belt is brought into contact with the wire electrode and rotates, and said feeding amount detecting means includes a photosensor for optically detecting the marks provided on the belt at the predetermined intervals.

9. A wire electrode supplying apparatus for a wire electric discharge machine, comprising:
   a feeding section for feeding, a wire electrode;
   a feeding-side guide section through which the wire electrode fed from said feeding section is passed through and which is adapted to constrain the direction of movement of the wire electrode;
   a receiving-side guide section for guiding the wire electrode, said receiving-side guide section being disposed in such a manner as to oppose said feeding-side guide section, and the wire electrode fed from said feeding-side guide section being passed through said receiving-side guide section;
   a feeding amount detecting means for detecting an amount of the wire electrode fed from said feeding section;
   a jet nozzle for constraining the direction of movement, toward said receiving-side guide section, of the wire electrode fed from said feeding-side guide section, as a jet of working fluid flows toward said receiving-side guide section; and
   control means for controlling the speed of feeding the wire electrode in said feeding section in correspondence with the detected result of said feeding amount detecting means.

10. A wire electrode supplying machine for a wire electric discharge machine according to claim 9, wherein said feeding-side guide section has at its tip a small opening for positioning the wire electrode, and said control means ascertains the position of the tip of the wire electrode on the basis of the detected result of said feeding amount detecting means, and lowers the speed of feeding the wire electrode immediately before the tip of the wire electrode reaches said small opening in said feeding-side guide section, and increases the speed of feeding the wire electrode immediately after the tip of the wire electrode passes said small opening.

11. A wire electrode supplying machine for a wire electric discharge machine according to claim 10, wherein said receiving-side guide section has at its tip a small opening for positioning the wire electrode, and said control means ascertains the position of the tip of the wire electrode on the basis of the detected result of said feeding amount detecting means, and lowers the speed of feeding the wire electrode immediately before the tip of the wire electrode reaches said small opening in said receiving-side guide section, and increases the speed of feeding the wire electrode immediately after the tip of the wire electrode passes said small opening.

12. A wire electrode supplying machine for a wire electric discharge machine according to claim 9, wherein said receiving-side guide section has at its tip a small opening for positioning the wire electrode, and said control means ascertains the position of the tip of the wire electrode on the basis of the detected result of said feeding amount detecting means, and lowers the speed of feeding the wire electrode immediately before the tip of the wire electrode reaches said small opening in said receiving-side guide section, and increases the speed of feeding the wire electrode immediately after the tip of the wire electrode passes said small opening.

13. A wire electrode supplying machine for a wire electric discharge machine according to claim 9, wherein said feeding section has a roller for feeding the wire electrode as said roller is brought into contact with the wire electrode and rotates, and said feeding amount detecting means includes a rotary encoder for outputting a pulse signal in correspondence with the rotation of said roller.

14. A wire electrode supplying machine for a wire electric discharge machine according to claim 13, wherein said feeding amount detecting means further includes a counter for counting the number of pulses outputted from said rotary encoder and a comparator for comparing the counted result of said counter with a predetermined value.

15. A wire electrode supplying machine for a wire electric discharge machine according to claim 9, wherein said feeding section has a belt for feeding the wire electrode as said belt is brought into contact with the wire electrode and rotates and a pulley for moving said belt, and said feeding amount detecting means includes a rotary encoder for outputting a pulse signal in correspondence with the rotation of said pulley.

16. A wire electrode supplying machine for a wire electric discharge machine according to claim 9, wherein said feeding section has a belt on which optically detectable marks are provided at predetermined intervals and which is adapted to feed the wire electrode as said belt is brought into contact with the wire electrode and rotates, and said feeding amount detecting means includes a photosensor for optically detecting the marks provided on the belt at the predetermined intervals.

17. A wire electrode supplying apparatus for a wire electric discharge machine, comprising:
  a feeding section for feeding a wire electrode;
  a feeding-side guide section through which the wire electrode fed from said feeding section is passed through and which is adapted to constrain the direction of movement of the wire electrode;
  a receiving-side guide section for guiding the wire electrode, said receiving-side guide section being disposed in such a manner as to oppose said feeding-side guide section, and the wire electrode fed from said feeding-side guide section being passed through said receiving-side guide section;
  a feeding amount detecting means for detecting an amount of the wire electrode fed from said feeding section;
  a jet nozzle for constraining the direction of movement, toward said receiving-side guide section, of the wire electrode fed from said feeding-side guide section, as a jet of working fluid flows toward said receiving-side guide section; and
  control means for controlling the speed of feeding the wire electrode in said feeding section and controlling the supply of the jet to said jet nozzle in correspondence with the detected result of said feeding amount detecting means.

18. A wire electrode supplying machine for a wire electric discharge machine according to claim 17, wherein said feeding section has a roller for feeding the wire electrode as said roller is brought into contact with the wire electrode and rotates, and said feeding amount detecting means includes a rotary encoder for outputting a pulse signal in correspondence with the rotation of said roller, a counter for counting the number of pulses outputted from said rotary encoder, and a comparator for comparing the counted result of said counter with a predetermined value.

19. A wire electrode supplying machine for a wire electric discharge machine according to claim 17, wherein said feeding section has a belt for feeding the wire electrode as said belt is brought into contact with the wire electrode and rotates and a pulley for moving said belt, and said feeding amount detecting means includes a rotary encoder for outputting a pulse signal in correspondence with the rotation of said pulley.

20. A wire electrode supplying machine for a wire electric discharge machine according to claim 17, wherein said feeding section has a belt on which optically detectable marks are provided at predetermined intervals and which is adapted to feed the wire electrode as said belt is brought into contact with the wire electrode and rotates, and said feeding amount detecting means includes a photosensor for optically detecting the marks provided on the belt at the predetermined intervals.

* * * * *